US011957280B2

(12) United States Patent
Cascia et al.

(10) Patent No.: US 11,957,280 B2
(45) Date of Patent: Apr. 16, 2024

(54) TOILET ROLL SPINDLE LIGHTING DEVICE

(71) Applicants: Phil Cascia, Oklahoma City, OK (US); Marde Burke, Oklahoma City, OK (US); Nathan Moran, Oklahoma City, OK (US); Lawrence Villarroel, Oklahoma City, OK (US); Ryan Egbert, Oklahoma City, OK (US)

(72) Inventors: Phil Cascia, Oklahoma City, OK (US); Marde Burke, Oklahoma City, OK (US); Nathan Moran, Oklahoma City, OK (US); Lawrence Villarroel, Oklahoma City, OK (US); Ryan Egbert, Oklahoma City, OK (US)

(73) Assignee: Jasco Products Company, LLC, Oklahoma City, OK (US)

( * ) Notice: Subject to any disclaimer, the term of this patent is extended or adjusted under 35 U.S.C. 154(b) by 292 days.

(21) Appl. No.: 17/402,579

(22) Filed: Aug. 15, 2021

(65) Prior Publication Data

US 2023/0049234 A1 Feb. 16, 2023

(51) Int. Cl.
*A47K 10/40* (2006.01)
*A47K 10/38* (2006.01)
*F21V 23/04* (2006.01)

(52) U.S. Cl.
CPC .......... *A47K 10/40* (2013.01); *A47K 10/3836* (2013.01); *F21V 23/0435* (2013.01); *F21V 23/0464* (2013.01); *F21V 23/0471* (2013.01)

(58) Field of Classification Search
None
See application file for complete search history.

(56) References Cited

U.S. PATENT DOCUMENTS

| | | | | |
|---|---|---|---|---|
| 5,450,299 | A * | 9/1995 | Lepre | E04F 11/1804<br>362/276 |
| 6,672,552 | B1 * | 1/2004 | Jao | A47H 1/142<br>248/254 |
| 6,758,584 | B2 * | 7/2004 | Bach | B60Q 3/267<br>362/399 |
| 6,772,975 | B2 * | 8/2004 | Sommerfeld | A47K 10/38<br>242/563.2 |
| 7,901,115 | B2 * | 3/2011 | Chien | F21S 8/035<br>362/382 |

(Continued)

*Primary Examiner* — William A. Rivera
(74) *Attorney, Agent, or Firm* — William D. Popejoy

(57) ABSTRACT

The present invention pertains to paper product devices for holding toilet paper, particularly toilet roll spindles and holders that simultaneously provide illumination in an area. Embodiments described for the present invention use a toilet paper spindle housing, one or more springs designed to hold the electrical device in place, a power source, often battery powered, one or more lights within the housing to illuminate an area around and including a toilet, an ambient light sensor to detect an ambient light level, a toilet paper slide preventer and motion sensor guard, and one or more passive infrared sensors to detect movement in an area. The embodiment may illuminate an area for a specific time duration once motion or occupancy is detected. In one embodiment, the toilet roll spindle housing attaches vertically to a freestanding base and may be comprised of a power source, a photocell sensor, and infrared sensors.

21 Claims, 3 Drawing Sheets

(56) References Cited

U.S. PATENT DOCUMENTS

| | | | | |
|---|---|---|---|---|
| 8,033,686 | B2 * | 10/2011 | Recker | H05B 47/24 362/249.02 |
| 8,206,003 | B1 * | 6/2012 | LaBarge | F21V 23/0464 362/186 |
| 9,772,078 | B2 * | 9/2017 | Suggs | F21V 23/04 |
| 9,838,091 | B2 * | 12/2017 | Xu | H04B 7/0665 |
| 10,582,813 | B2 * | 3/2020 | Carter | A47K 10/38 |
| 11,428,401 | B2 * | 8/2022 | Edwards | A47K 10/38 |
| 11,617,478 | B2 * | 4/2023 | Murphy | A47K 10/38 242/590 |
| 2003/0189127 | A1 * | 10/2003 | Arendt | F21V 33/004 242/598.5 |
| 2006/0217820 | A1 * | 9/2006 | Holt | A47K 10/40 700/46 |
| 2008/0080173 | A1 * | 4/2008 | Trimble | E04F 11/18 362/146 |
| 2008/0184475 | A1 * | 8/2008 | Sladick | G02B 6/0008 362/147 |
| 2008/0266844 | A1 * | 10/2008 | Reynolds | F21V 33/004 362/147 |
| 2014/0076508 | A1 * | 3/2014 | Mullet | B23B 3/00 160/310 |
| 2017/0112334 | A1 * | 4/2017 | Holland | A47K 10/12 |
| 2017/0280947 | A1 * | 10/2017 | Yocom | F21V 33/004 |
| 2017/0343205 | A1 * | 11/2017 | Heuer | F21V 23/0471 |
| 2019/0159638 | A1 * | 5/2019 | Carter | F21V 15/01 |

* cited by examiner

TOILET ROLL SPINDLE LIGHTING DEVICE

BACKGROUND OF THE INVENTION

1. Field of the Invention

The present invention pertains to paper product devices for holding toilet paper, particularly toilet roll spindles and holders that simultaneously provide illumination in an area.

2. Description of the Related Art

Night lights are well known and widely used in a number of contexts and applications. They may provide a low level of illumination to a room or area during periods of time when ambient light levels are low. Night lights generally provide enough illumination to permit persons to see the outline of objects, walls, or doors, thus allowing safe movement in a given area.

The benefits of night light illumination during night time hours is well documented. Circadian rhythms, 24-hour natural cycles of physical and mental behavior, regulate the internal sleep process, and may be greatly affected by artificial light. Artificial light, when timed inappropriately in relation to the biological clock, may cause drastic disruptions to the biological rhythms. Circadian rhythm disruption may cause various metabolic and chronic conditions to arise, including depression and obesity, among others. The low level illumination provided by a night light may be less intrusive to a persons circadian rhythm. Further, controlling the duration, intensity, and wavelength of the night light during night time hours may provide biological benefits.

Within the home, a night time trip to the restroom constitutes one of the most probable reasons for movement in an area with low level ambient light. The illumination of objects around and on the toilet, and the location of the toilet itself is necessary during such a night time bathroom visit. While trying to avoid the circadian rhythm disruption that a medium-high level illumination may provide, certain night light options may not be available.

Often toilets are located: in private rooms in which electrical outlets may not be located, far away from any electrical outlets, or tucked behind a half wall.

The following related arts have shown different toilet paper roll spindles or holders that simultaneously illuminate an area:

U.S. Pat. No. 10,582,813 B2 teaches a toilet roll spindle with temporary bathroom and toilet illumination. The device contains various electronic subassemblies that operate together as a bathroom night lighting system. The spindle utilizes an accelerometer to detect vibration of the device to activate a switch which activates a light.

U.S. Pat. No. 8,206,003 B1 teaches an illuminated holder for storing one roll of toilet paper in a protected and conveniently accessible position atop a toilet tank. The device utilizes a photovoltaic cell and rechargeable battery to power a LED light, and a sensor to automatically activate the LED light in dimly lit surroundings.

SUMMARY OF THE INVENTION

Embodiments described for the present invention use a toilet paper spindle housing, one or more springs designed to hold the electrical device in place, a power source, often battery powered, one or more lights within the housing to illuminate an area around and including a toilet, an ambient light sensor to detect an ambient light level, a toilet paper slide preventer and motion sensor guard, and one or more passive infrared sensors to detect movement in an area. The embodiment may illuminate an area for a specific time duration once motion or occupancy is detected.

In another embodiment of the invention, the toilet roll spindle housing attaches vertically to a freestanding base and may or may not be held in place by one or more springs. The embodiment may be comprised of a power source, a photocell sensor, and one or more infrared sensors.

In some embodiments, the one or more lights within the housing are light emitting diodes, which may be adjustable to any color or intensity. The device may comprise of any one or more of the following: 360-degree illumination, one or more flat lenses, a minimum of one integrated control button, and a wireless RF or IR remote control such as a timeout, light intensity, or color changing feature.

It should be appreciated that combinations of the foregoing concepts and additional concepts discussed in greater detail below are contemplated as being part of the inventive subject matter disclosed herein. In particular, all combinations of claimed subject matter appearing at the end of this disclosure, or elsewhere herein, are contemplated as being part of the inventive subject matter.

These and other systems, methods, objects, features, and advantages of the present invention will be apparent to those skilled in the art from the following detailed description of the preferred embodiment and the drawings.

BRIEF DESCRIPTION OF THE DRAWINGS

One or more embodiments are illustrated by way of example, and not by limitation, reference will now be made to the accompanying drawings, having the same numeral designations to represent like elements throughout and wherein.

Figures 1, 2:
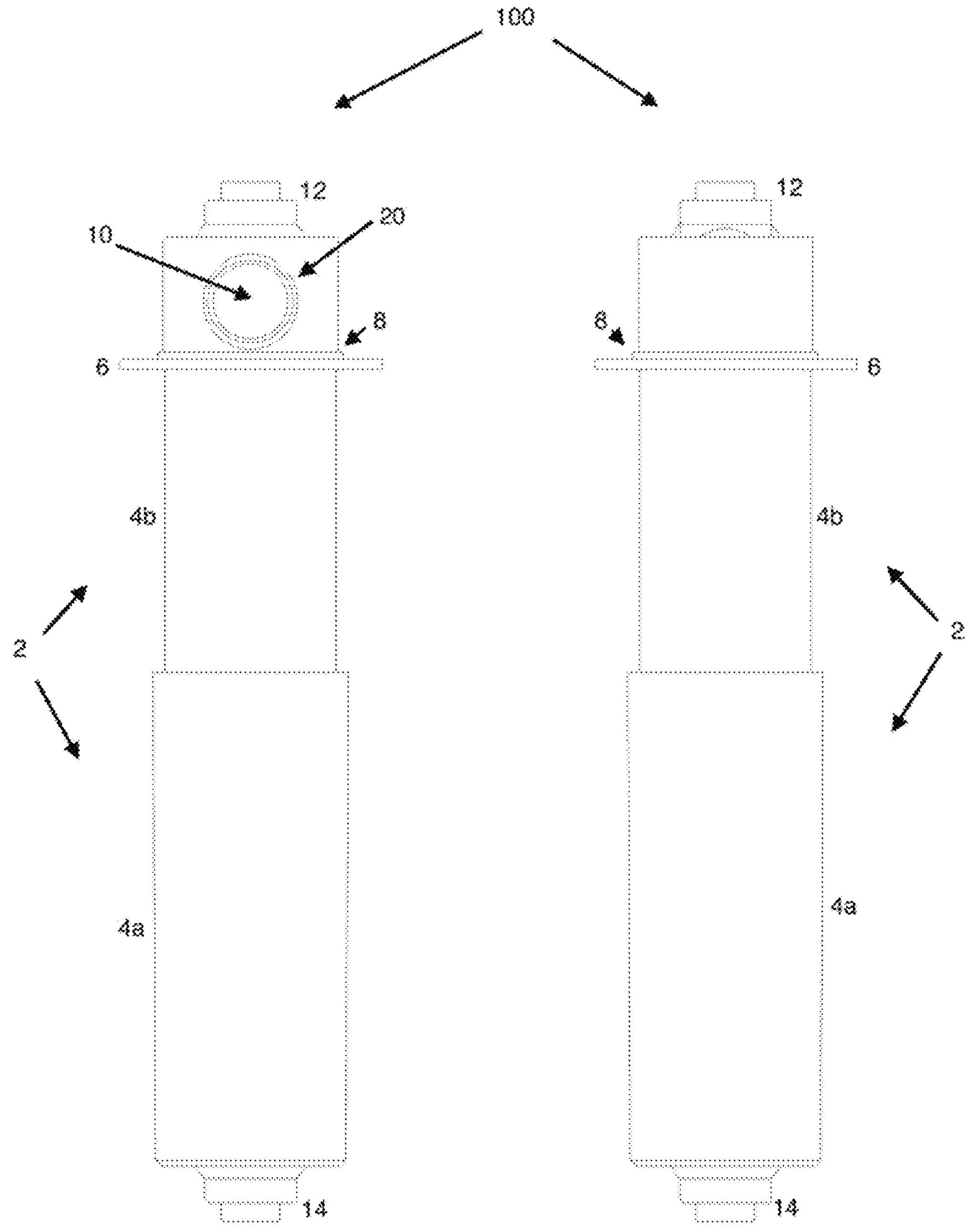
FIG. 1 is a front elevational view of an embodiment of the current invention.
FIG. 2 is a rear elevational view of an embodiment of the current invention.
Figure 3:
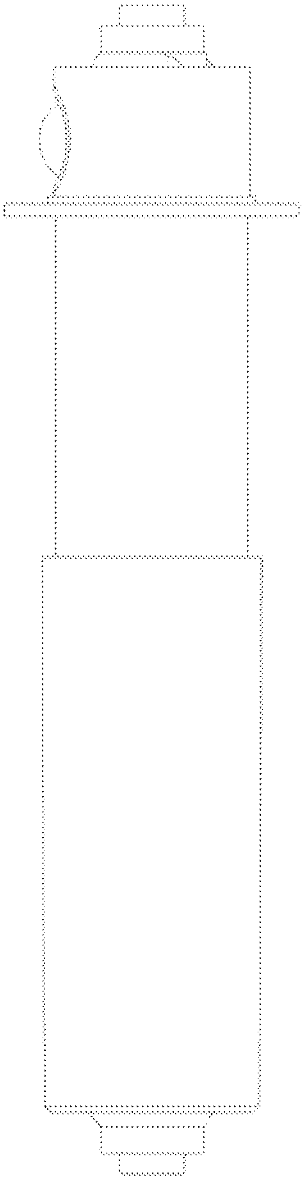
FIG. 3 is a left elevational view of an embodiment of the current invention.
Figure 4:
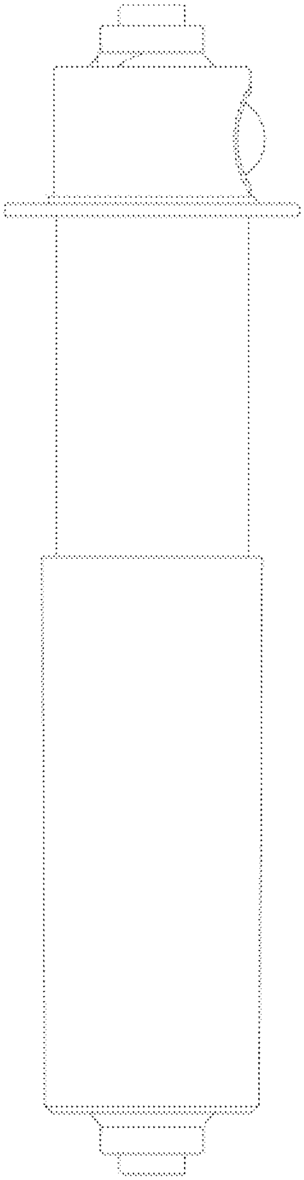
FIG. 4 is a right elevational view of an embodiment of the current invention.
Figure 5:
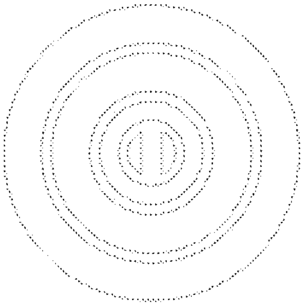
FIG. 5 is a bottom elevational view of an embodiment of the current invention.
Figure 6:
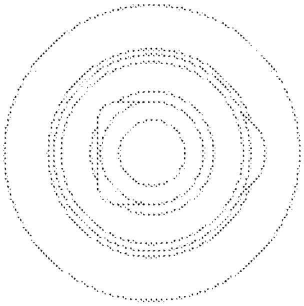
FIG. 6 is a top elevational view of an embodiment of the current invention.

While the invention has been described in connection with certain preferred embodiments, other embodiments would be understood by one of ordinary skill in the art and are encompassed herein.

Elements with corresponding reference numerals:

| | |
|---|---|
| Toilet Roll Spindle Lighting Device | 100 |
| Spindle housing | 2 |
| Spindle housing sub component A | 4a |
| Spindle housing sub component B | 4b |
| Toilet paper slide preventer and motion sensor guard | 6 |
| Toilet paper slide preventer and motion sensor guard lip | 8 |
| Motion sensor | 10 |

-continued

| | |
|---|---|
| Spindle housing end A | 12 |
| Spindle housing end B | 14 |
| Spindle housing end tab | 16 |
| Turn cap | 18 |
| LEDs | 20 |

DETAIL DESCRIPTION OF THE INVENTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. Well-known structures and devices are shown in order to facilitate describing the subject innovation. Moreover, it is to be appreciated that the drawings may not be to scale.

FIG. 1 is a front elevational view of an embodiment of a toilet roll spindle lighting device 100. The toilet roll spindle lighting device 100 may include a variety of additional components. The toilet roll spindle lighting device 100 may be used to replace most standard sized toilet roll spindles. The device utilizes a spring component (not shown) located inside a spindle housing 2 to force constant pressure through a spindle housing end A 12 and a spindle housing end B 14. The spring component may be one or more individual springs.

The force from the spring component extends a spindle housing sub component B 4*b* farther out from a spindle housing sub component A 4*a*. The pressure at both ends of the device keep the device secured when placed within a toilet roll spindle holder. A greater force in the opposing direction of the spring component force may be applied to compress the toilet roll spindle lighting device for the removal and replacement of a toilet roll or rolls. Alternate methods of attachment of the toilet roll spindle lighting device to a toilet roll spindle housing known to persons having ordinary skill in the art may be utilized and are within the scope of the current invention.

In this embodiment, the toilet roll spindle lighting device 100 comprises a motion sensor 10. The motion sensor 10 may be a passive infrared sensor (PIR). With a PIR sensor, the device measures infrared light radiating from objects in an area. The PIR sensor can detect changes in the amount of infrared radiation impinging upon it. When a person enters an area near the toilet roll spindle, the PIR sensor will convert the resulting change into an output signal.

The resulting change in the area will trigger the illumination of the lighting device. The device may use one or more light-emitting diodes (LEDs) to illuminate an area. Flat Fresnel Lenses may be utilized instead of dome shaped lenses for superior aesthetics and function. In FIG. 1, the LEDs 20 are located around the circumference of the motion sensor 10, Fresnel lens area.

Alternate light sources known to those having skill in the art my be used as a light source. Various locations of the LEDs 20 are disclosed herein. The LEDs 20 may be placed: at one or both ends of the spindle, down the length of the spindle, or any place within or affixed to the spindle housing 2. Chip on board (COB) LEDs 20 may be utilized in the device. The LEDs 20, or alternate light source, may be placed within a spindle housing 2 that is composed of translucent material.

The device may provide up to 360-degree lighting at low lumens. Other degree lighting options and lumen levels are within the scope of the present invention. Embodiments of the lighting device may illuminate a 10-foot range. Other ranges of illumination are within the scope of the present invention.

The toilet roll spindle lighting device 100 may include an ambient light sensor (not shown). The ambient light sensor allows the device to operate in a dusk to dawn mode, where the device only illuminates when the ambient light is below a certain threshold. Alternate embodiments of the device may allow the device to operate as a constant night light, where the lighting device illuminates in low ambient light conditions even without the detection of motion in an area. The ambient light sensor may be a photocell sensor, photodiodes, cds, or other means. The ambient light sensor may be located below a fresnel lens for the motion sensor 10.

In other embodiments the device may operate in different modes: dusk to dawn, motion detect, motion boost, or other modes available to one having ordinary skill in the art. Motion boost is defined where the device illuminates to a certain intensity and then illuminates at a greater intensity once motion is detected. The modes may be selected via switches or buttons on the device, wireless control via an application, or through a personal computer, phone, tablet, or remote.

Figure 7:
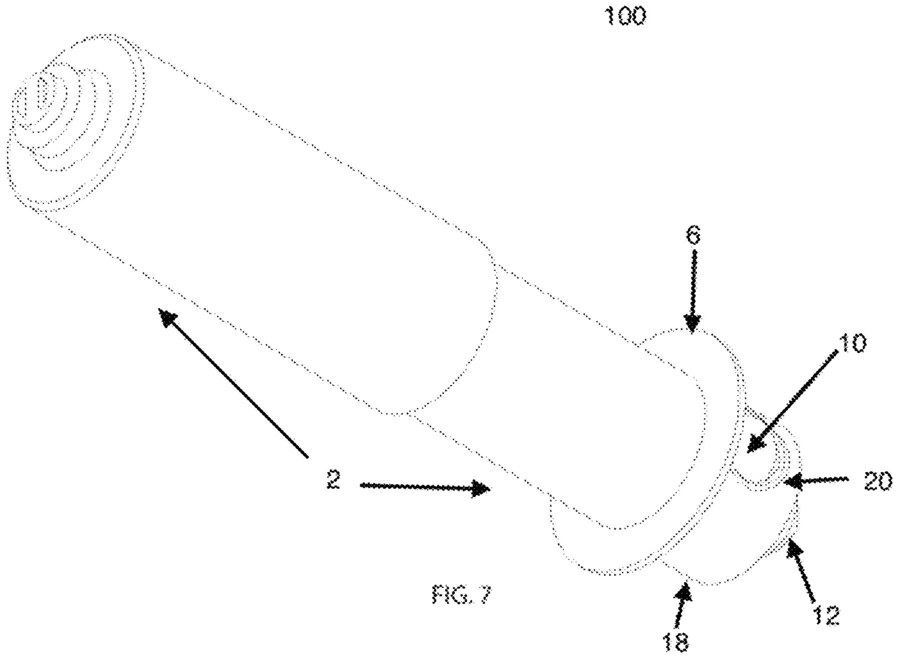
FIG. 7 is a perspective view of an embodiment of the current invention.
Figure 8:
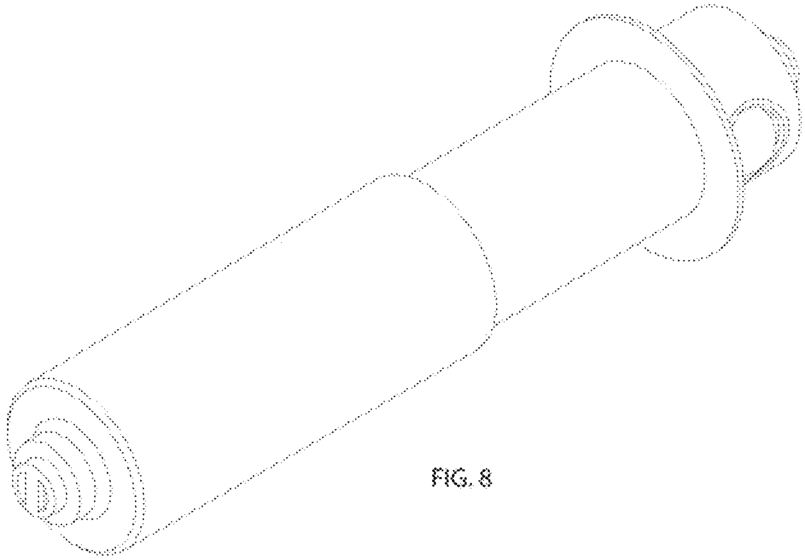
FIG. 8 is another perspective view of an embodiment of the current invention.

FIG. 7 is a perspective view of an embodiment of the toilet roll spindle lighting device 100. The device may comprise a turn cap 18 at one end of the spindle housing 2 to operate as a battery door. In this embodiment, the turn cap 18 is comprised of the LEDs 20, motion sensor 10, Fresnel lens, and spindle housing end A 12. The turn cap 18 rotates clockwise or counter-clockwise to open or close. Once the turn cap 18 is opened and removed, the battery compartment (not shown) is accessible.

Other variations with alternate power sources and modifications are apparent. Battery access may be obtained through alternate methods and modifications to those having skill in the art. Screw mechanisms, snap-on, magnetic, and other obvious variations are within the scope of the present invention. C batteries, AAA batteries, or any other conceivable battery form may used to power the device.

The toilet roll spindle lighting device 100 may comprise a toilet paper slide preventer and motion sensor guard (necktie) 6 attached to the spindle housing 2. The necktie 6 is specifically engineered to limit the available movement a toilet roll may have along the length of the device. The necktie creates a barrier which permits the motion detect sensor 10 to have a line of sight to a desired area near the toilet roll spindle lighting device 100. Without the inclusion of the necktie 6, the toilet roll may slide on the spindle and obstruct the view of the motion detect sensor 10. In this embodiment, the necktie 6 also prevents the toilet roll from obstructing the LEDs in the device.

Multiple variations of the toilet paper slide preventer and motion sensor guard 6 are within the scope of this invention.

Although the present invention has been described in relation to particular embodiments thereof, many other variations and modifications will become apparent to those skilled in the art. It is preferred, therefore, that the present invention be limited not by the specific disclosure herein, but only by the appended claims. Alternative embodiments may be devised without departing from the spirit or scope of the invention. Further, the particular feature or structure may be combined in any suitable manner in one or more embodiments.

What is claimed is:

1. An electrical device comprising:
a toilet roll spindle housing;
a power source;
one or more lights;
an ambient light sensor;
one or more passive infrared sensors;
the power source, the one or more lights, the ambient light sensor, and the one or more passive infrared sensors are all contained within the toilet roll spindle housing; and
a toilet roll slide preventer and motion sensor guard, whereas the toilet roll slide preventer and motion sensor guard is attached to the toilet roll spindle housing, whereas the toilet roll slide preventer and motion sensor guard is configured to provide the one or more passive infrared sensors a line of sight to an area near the electrical device, whereas the one or more passive infrared sensors are configured to be aimed in a direction perpendicular to the longitudinal axis of the toilet spindle housing.

2. The electrical device as claimed in claim 1, further comprising:
one or more springs within the toilet roll spindle housing designed to hold the electrical device in place; and
the one or more springs within the toilet roll spindle housing affix the toilet roll spindle housing to a toilet roll holder.

3. The electrical device as claimed in claim 1, further comprising:
the one or more lights within the toilet roll spindle housing provide from 10-degree to up to 360-degree illumination.

4. The electrical device as claimed in claim 1, further comprising:
a minimum of one light lens.

5. The electrical device as claimed in claim 1, further comprising:
the one or more lights within the toilet roll spindle housing are light emitting diodes; and
the light emitting diodes configured to be a set color or configured to adjust within a range of color or intensity level.

6. The electrical device as claimed in claim 1, further comprising:
the one or more lights within the toilet roll spindle housing remain on for a set duration after the one or more passive infrared sensors have detected motion in an area.

7. The electrical device as claimed in claim 1, further comprising:
a wireless RF or IR remote control such as a timeout, light intensity, or color changing feature.

8. The electrical device as claimed in claim 1, further comprising:
the toilet roll spindle housing configured to mount vertically or horizontally.

9. The electrical device as claimed in claim 1, further comprising:
the one or more passive infrared sensors configured to be motion detect sensors or occupancy sensors.

10. The electrical device as claimed in claim 1, further comprising:
a minimum of one switch.

11. The electrical device as claimed in claim 1, further comprising:
a freestanding base; and
the toilet roll spindle housing may mount vertically or horizontally.

12. The electrical device as claimed in claim 1, further comprising:
a minimum of one integrated control button.

13. An electrical device comprising:
a toilet roll spindle housing;
a power source;
one or more lights;
an ambient light sensor;
one or more passive infrared sensors;
the power source, the one or more lights, the ambient light sensor, and the one or more passive infrared sensors are all contained within the toilet roll spindle housing;
a toilet roll slide preventer and motion sensor guard, whereas the toilet roll slide preventer and motion sensor guard is attached to the toilet roll spindle housing, whereas the toilet roll slide preventer and motion sensor guard is configured to provide the one or more passive infrared sensors a line of sight to an area near the electrical device, whereas the one or more passive infrared sensors are configured to be aimed in a direction perpendicular to the longitudinal axis of the toilet spindle housing; and
the toilet roll slide preventer and motion sensor guard attaches to the toilet roll spindle housing medial to the one or more passive infrared sensors.

14. The electrical device as claimed in claim 13, further comprising:
one or more springs within the toilet roll spindle housing configured to hold the electrical device in place; and
the one or more springs within the toilet roll spindle housing affix the toilet roll spindle housing to a toilet roll holder.

15. The electrical device as claimed in claim 13, further comprising:
the one or more lights within the toilet roll spindle housing are light emitting diodes; and
the light emitting diodes configured to be a set color or configured to adjust within a range of color or intensity level.

16. The electrical device as claimed in claim 13, further comprising:
the one or more lights within the toilet roll spindle housing remain on for a set duration after the one or more passive infrared sensors have detected motion in an area.

17. The electrical device as claimed in claim 13, further comprising:
a wireless RF or IR remote control such as a timeout, light intensity, or color changing feature.

18. The electrical device as claimed in claim 13, further comprising:
the toilet roll spindle housing configured to mount vertically or horizontally.

19. The electrical device as claimed in claim 13, further comprising:
a freestanding base; and
the toilet roll spindle housing may mount vertically or horizontally.

20. The electrical device as claimed in claim 13, further comprising:
one or more springs within the toilet roll spindle housing configured to hold the electrical device in place; and the one or more springs within the toilet roll spindle housing affix the toilet roll spindle housing to a toilet roll holder.

21. The electrical device as claimed in claim 13, further comprising:

a minimum of one integrated control button.

* * * * *